US009957831B2

(12) United States Patent
Soman et al.

(10) Patent No.: US 9,957,831 B2
(45) Date of Patent: May 1, 2018

(54) SYSTEMS, METHODS, AND APPARATUS FOR ROTARY VANE ACTUATORS

(71) Applicant: The Boeing Company, Chicago, IL (US)

(72) Inventors: Charuhas M. Soman, Bothell, WA (US); Steven P. Walker, Arlington, WA (US); Michael K. Klein, Bothell, WA (US); John A. Standley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 682 days.

(21) Appl. No.: 14/448,785

(22) Filed: Jul. 31, 2014

(65) Prior Publication Data

US 2016/0032758 A1 Feb. 4, 2016

(51) Int. Cl.

*F15B 15/12* (2006.01)
*F01D 17/14* (2006.01)
*B64C 13/40* (2006.01)

(52) U.S. Cl.

CPC .............. *F01D 17/14* (2013.01); *B64C 13/40* (2013.01); *F15B 15/12* (2013.01)

(58) Field of Classification Search

CPC ......... F15B 15/12; B64C 13/24; B64C 13/38; B64C 13/40

(Continued)

(56) References Cited

U.S. PATENT DOCUMENTS 1,186,827 A * 6/1916 Pennypacker .......... F15B 15/12 91/391 R
2,854,956 A * 10/1958 Hager .................. B64C 25/505 137/82

(Continued)

FOREIGN PATENT DOCUMENTS

DE 1258275 B 1/1968
FR 1331146 5/1963

(Continued)

OTHER PUBLICATIONS

"European Application Serial No. 15179115.9, Search Report dated Dec. 11, 2015", 9 pgs.

(Continued)

*Primary Examiner* — Tien Q Dinh
*Assistant Examiner* — Michael A. Fabula
(74) *Attorney, Agent, or Firm* — Kwan & Olynick LLP

(57) ABSTRACT

Systems, methods, and devices are configured to implement hydraulic actuators. Devices may include a housing having an internal surface defining an internal cavity that may have a substantially circular cross sectional curvature. The devices may include a rotor that includes a first slot having a substantially circular curvature. The devices may include a first vane disk partially disposed within the first slot of the rotor, where the first vane disk has a substantially circular external geometry. The first vane disk may be mechanically coupled to the rotor via the first slot, and the first vane disk may be configured to form a first seal with the internal surface of the housing. The devices may include a first separator device that may be configured to form a second seal with the internal surface of the housing and a third seal with an external surface of the rotor.

19 Claims, 13 Drawing Sheets

(58) Field of Classification Search
USPC .................................... 92/120, 121, 122, 125
See application file for complete search history.

(56) References Cited

U.S. PATENT DOCUMENTS 2,870,748 A * 1/1959 Hemphill ................ B64C 13/40 244/226
2,890,889 A 6/1959 Work
2,996,049 A * 8/1961 Huska ................... F15B 15/125 92/120
3,020,008 A * 2/1962 Douglas .................. B64C 13/00 244/226
3,023,741 A * 3/1962 O'Connor ............... F15B 15/12 92/122
3,030,934 A * 4/1962 Herbst .................... F15B 15/12 277/345
3,032,020 A 5/1962 Franz
3,053,236 A * 9/1962 Self ......................... B64C 13/24 277/345
3,140,902 A * 7/1964 Herbst ................... F16J 15/104 277/345
3,155,013 A 11/1964 Douglas
3,155,019 A * 11/1964 Stiglic ....................... B64C 9/38 91/51
3,179,020 A 4/1965 Douglas et al.
3,198,090 A * 8/1965 French .................... F15B 15/12 384/138
3,276,332 A * 10/1966 Jaffe ....................... B64C 13/00 244/3.21
3,277,796 A * 10/1966 King ....................... F01C 1/063 277/389
3,327,592 A * 6/1967 Wilkinson .......... F16K 11/0525 417/242
3,359,871 A * 12/1967 Kamman ............... F16J 15/545 277/384
3,426,652 A * 2/1969 Blake ...................... F15B 15/12 91/41
3,731,599 A * 5/1973 Allen ........................ F03C 7/00 92/122
3,750,535 A * 8/1973 Higuchi .................. F15B 15/12 92/121
4,345,509 A 8/1982 Bridwell et al.
4,565,119 A 1/1986 Higuchi
4,611,530 A * 9/1986 Stoll ....................... F15B 15/12 92/125
4,628,797 A 12/1986 Kendall
4,784,047 A * 11/1988 Stoll ....................... F15B 15/12 277/345
4,817,504 A * 4/1989 Lieberman ............. F15B 15/12 92/121
5,017,106 A * 5/1991 Holss .................... F04C 27/008 417/481
5,044,257 A * 9/1991 Scobie .................... B29C 43/18 264/269
5,330,333 A 7/1994 Holmes
5,492,051 A 2/1996 Schiffler et al.
5,701,799 A * 12/1997 Granberg ................ F15B 15/12 92/121
5,722,616 A * 3/1998 Durand ................... F15B 15/12 244/226
5,813,316 A * 9/1998 Sekiya .................... F15B 15/12 277/358
5,823,092 A * 10/1998 Granberg ................ F15B 15/12 92/121
5,839,346 A * 11/1998 Sekiya .................... F15B 15/12 91/462
5,979,163 A * 11/1999 Hanners .................. F04C 9/002 60/571
6,520,068 B1 2/2003 Collier et al.
7,827,901 B2 * 11/2010 Kudarauskas ........... B60K 6/24 91/339
7,895,935 B2 * 3/2011 Kells ..................... F15B 15/125 92/120
7,930,971 B2 * 4/2011 Werkhoven
2001/0018864 A1 * 9/2001 Hirano .................... F01C 9/002 92/121
2004/0134345 A1 * 7/2004 Beilner ................... F01C 9/002 92/122
2004/0177751 A1 * 9/2004 Naumann ............. F01L 1/3442 92/120
2006/0196352 A1 * 9/2006 Holtz ...................... F01C 9/002 92/120
2010/0064885 A1 * 3/2010 Werkhoven
2011/0226124 A1 * 9/2011 Wang ...................... F15B 15/12 91/453
2012/0137873 A1 * 6/2012 Chapman ................ F01C 9/002 92/125
2013/0104729 A1 5/2013 Ito et al.
2013/0309115 A1 * 11/2013 Thorwart ................ F01C 1/324 418/52
2014/0174287 A1 * 6/2014 Smith ..................... F15B 15/12 92/121
2014/0238231 A1 8/2014 Kim et al.
2015/0240827 A1 * 8/2015 Hoemke ................. F01D 17/26 415/1
2017/0114808 A1 * 4/2017 Cowie ..................... F15B 15/12

FOREIGN PATENT DOCUMENTS

GB 1286731 8/1972
GB 2050512 A 1/1981

OTHER PUBLICATIONS

"European Application Serial No. 15179115.9, Office Action dated Feb. 12, 2018", 5 pgs.

* cited by examiner

SYSTEMS, METHODS, AND APPARATUS FOR ROTARY VANE ACTUATORS

TECHNICAL FIELD

This disclosure generally relates to vehicles and machinery and, more specifically, to hydraulic systems implemented in such vehicles and machinery.

BACKGROUND

Hydraulic motors or devices may be mechanical actuators that convert hydraulic pressure and flow into some sort of displacement. Thus, a hydraulic device may utilize hydraulic pressure, which may be generated by the flow of hydraulic fluid, to create a structural or mechanical displacement that may be used to move one or more components of a mechanical system. In the context of vehicles, and more specifically, aircraft, such hydraulic devices may potentially be utilized to move various parts of the vehicle, which may be an aircraft. However, conventional rotary hydraulic devices remain limited because they may be heavy and over-burdensome due to their design constraints, and they may be prone to large internal leakages which make them unsuitable for high pressure operation, as may be encountered in the aerospace industry.

For example, conventional hydraulic devices may include linear hydraulic cylinders which require the use of additional mechanical apparatus, such as rack and pinion gearing mechanisms, to convert linear motion produced by the linear hydraulic cylinder into rotational motion, as may be used in particular applications within the context of a vehicle such as an aerospace vehicle. The inclusion of such additional mechanical apparatus may result in the hydraulic device being relatively large, heavy, and not well-suited for aerospace applications due to the additional weight and space taken by the linear hydraulic cylinder and its associated gearing mechanisms.

Other conventional hydraulic devices may utilize vanes to convert hydraulic pressure to motion. However, such conventional hydraulic devices often utilize flat housings and flat seals which are structurally less efficient, and consequently more prone to deflections of components and unacceptable internal leakages. For example, components such as the vanes themselves may bend and deflect resulting in poor sealing and large internal leakages. Consequently, such conventional hydraulic devices are unsuitable for use in aerospace applications such as high pressure operation conditions which may be in excess of 3000 psi.

SUMMARY

Systems, method, and devices for manufacturing, using, and otherwise implementing hydraulic actuators are disclosed herein. Devices as disclosed herein may include a housing having an internal surface defining an internal cavity, where the housing may be configured to transfer hydraulic fluid between the internal cavity and an external reservoir. In some embodiments, the internal cavity may have a substantially circular cross sectional curvature. The devices may also include a rotor coupled to the housing, where the rotor includes a first slot having a substantially circular curvature. In some embodiments, the rotor may be configured to rotate within the housing in response to an application of a rotational force. The devices may also include a first vane disk partially disposed within the first slot of the rotor, where the first vane disk has a substantially circular external geometry. In some embodiments, the first vane disk may be mechanically coupled to the rotor via the first slot, and the first vane disk may be configured to form a first seal with the internal surface of the housing. The devices may further include a first separator device included in the internal cavity of the housing, where the first separator device may be configured to form a second seal with the internal surface of the housing and a third seal with an external surface of the rotor.

In some embodiments, the first vane disk may be disposed about half way into the first slot. In various embodiments, the internal cavity includes a first hydraulic chamber defined by a portion of the internal surface, a portion of an exterior surface of the rotor, a first surface of the first vane disk, and a first surface of the first separator device. In some embodiments, the first separator device includes an internal pathway and a port configured to transfer the hydraulic fluid between the first hydraulic chamber and the external reservoir. According to some embodiments, the rotor also includes a second slot and a third slot. In various embodiments, the devices may also include a second vane disk partially disposed within the second slot, where the second vane disk has a substantially circular external geometry, and a second separator device forming a second hydraulic chamber between the second vane disk and the second separator device. The devices may also include a third vane disk partially disposed within the third slot, where the third vane disk has a substantially circular external geometry, and a third separator device forming a third hydraulic chamber between the third vane disk and the third separator device.

In some embodiments, the first vane disk, the second vane disk, and the third vane disk each include a sealing device that may include an O-ring seal. In various embodiments, the first separator device, the second separator device, and the third separator device each include a stationary seal coupled to the internal surface of the housing and a wiper seal coupled to the external surface of the rotor. According to various embodiments, a rotary travel of the rotor is between about 60 degrees and 180 degrees. In some embodiments, the housing and the rotor are made of steel, titanium, aluminum, Inconel, copper beryllium, or any of their alloys. In some embodiments, the rotor is coupled to a control surface of an airplane. The control surface may be configured to affect a flight characteristic of the airplane. Furthermore, the rotor may be configured to transfer the rotational force to the control surface in response to receiving the rotational force from the first vane disk. In some embodiments, the rotor is included in a trailing edge cavity of an airplane wing included in the airplane and the control surface is an airplane spoiler.

Also disclosed herein are systems that may include a first housing having a first internal surface defining a first internal cavity, where the first housing is configured to transfer hydraulic fluid between the first internal cavity and an external reservoir, and where the first internal cavity has a substantially circular cross sectional curvature. The systems may also include a first rotor coupled to the first housing, where the first rotor includes a first plurality of slots each having a substantially circular curvature, and where the first rotor is configured to rotate within the first housing in response to an application of a first rotational force. The systems may also include a first plurality of vane disks partially disposed within the first plurality of slots of the first rotor, where the first plurality of vane disks each have a substantially circular external geometry. In some embodiments, the first plurality of vane disks are each mechanically coupled to the first rotor via the first plurality of slots, and the first plurality of vane disks are configured to form a first plurality of seals with the first internal surface of the first housing. The systems may also include a first plurality of separator devices included in the first internal cavity of the first housing, where the first plurality of separator devices are configured to form a second plurality of seals with the first internal surface of the first housing and a third plurality of seals with an external surface of the first rotor. The systems may also include a hydraulic pump configured to pump hydraulic fluid between the first internal cavity and an external reservoir via a first plurality of ports included in the first plurality of separator devices.

In some embodiments, the first internal cavity includes a first plurality of hydraulic chambers, where each hydraulic chamber of the first plurality of hydraulic chambers is defined by a portion of the first internal surface, a portion of an exterior surface of the first rotor, a first surface of each vane disk of the first plurality of vane disks, and a first surface of each separator device of the first plurality of separator devices. According to various embodiments, each seal of the second plurality of seals includes a stationary seal between a separator device of the first plurality of separator devices and the first internal surface of the first housing. In some embodiments, each seal of the third plurality of seals includes a wiper seal between a separator device of the first plurality of separator devices and the external surface of the rotor. In some embodiments, the systems may also include a second housing having a second internal surface defining a second internal cavity and a second rotor coupled to the second housing, where the second rotor includes a second plurality of slots, and where the second rotor is configured to rotate within the second housing in response to an application of a second rotational force. The systems may further include a second plurality of vane disks partially disposed within the second plurality of slots, where the second plurality of vane disks each have a substantially circular external geometry, and where the second plurality of vane disks are each mechanically coupled to the second rotor via the second plurality of slots. In some embodiments, the second plurality of vane disks is configured to form a fourth plurality of seals with the second internal surface of the second housing. In some embodiments, the first rotor is mechanically coupled to the second rotor.

Also disclosed herein are methods that may include providing at least one vane disk and a rotor, where the rotor includes at least one slot having a first geometry determined based on an external geometry of the at least one vane disk, and where the external geometry of the at least one vane disk is substantially circular. The methods may also include including the at least one vane disk in the rotor via the at least one slot such that the at least one vane disk is at least partially disposed within the rotor. The methods may also include including the at least one vane disk and the rotor in an internal cavity of a housing, where the internal cavity has a second geometry that is determined based on the external geometry of the at least one vane disk. The methods may also include including at least one separator device in the housing. In some embodiments, the providing of the at least one vane disk and the rotor includes machining the at least one vane disk and the rotor from a metal. In various embodiments, the metal may be selected from the group consisting of: steel, titanium, aluminum, Inconel, copper beryllium, and any of their alloys.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As previously discussed, conventional hydraulic devices remain limited because they may be heavy and over-burdensome due to their design constraints, and they are prone to internal leakages which make them unsuitable for high pressure operation, as may be encountered in the aerospace industry. For example, conventional hydraulic devices may include linear hydraulic cylinders which require the use of additional mechanical apparatus, such as rack and pinion gearing mechanisms, to convert linear motion to rotational motion. Such additional instrumentation can be heavy and prone to failure. Other conventional hydraulic devices may utilize vanes to convert hydraulic pressure to motion. However, such conventional hydraulic devices often utilize flat housings and flat seals which are structurally less efficient, and consequently more prone to deflections of components and internal leakage, consequently making them unsuitable for use in high pressure operation conditions which may be in excess of 3000 psi.

Various systems, methods, and apparatus are disclosed herein that provide a rotary vane hydraulic actuator that is suitable for high pressure operations while also maintaining a minimal weight, thus making them suitable for aerospace applications. Rotary vane hydraulic actuators as disclosed herein may include circular housing walls and circular vanes that may employ robust seals, such as O-ring seals. The use of a circular geometry enables more efficient movement of internal components of the hydraulic actuator because the components undergo hoop stresses instead of the bending that may be associated with flat housings and flat components. Accordingly, internal leakage is minimized even at high operational pressures. Moreover, because no additional internal fasteners are required to couple the vanes to a rotor which may be included in the hydraulic actuator, hydraulic actuators as disclosed herein are significantly lighter than conventional hydraulic devices.

Figure 1A:
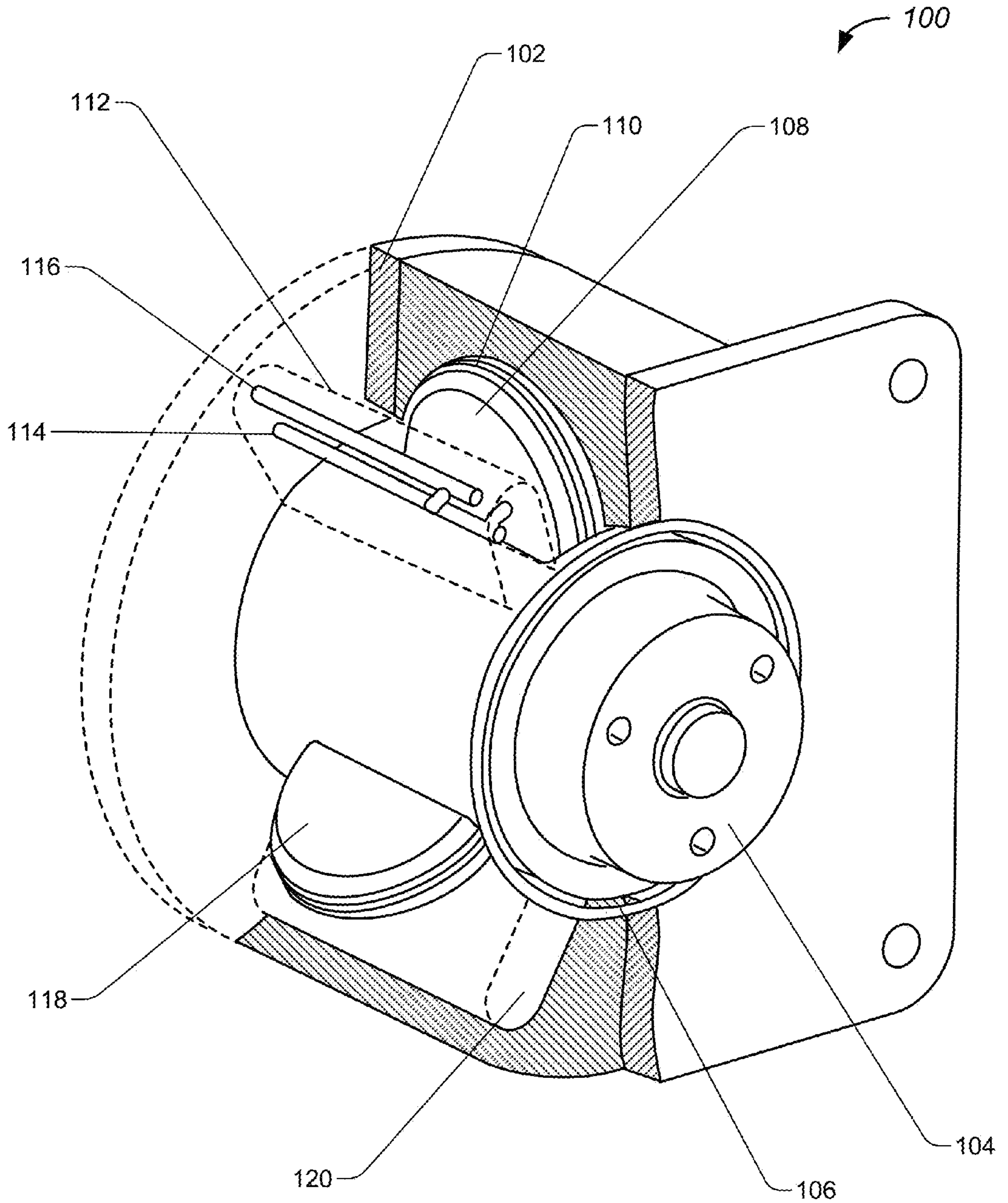
FIG. 1A illustrates a diagram of an example of a hydraulic actuator, implemented in accordance with some embodiments.

FIG. 1A illustrates a diagram of an example of a hydraulic actuator, implemented in accordance with some embodiments. In various embodiments, a hydraulic actuator, such as hydraulic actuator 100, may be configured to transfer a hydraulic force to a rotor, thus causing the rotor to transfer that force to another mechanical component as a rotational force. As will be discussed in greater detail below, various components of hydraulic actuator 100 may have a substantially circular geometry that enables the use of such an actuator in high pressure applications, while maintaining a minimal overall weight due to the few components used, and also while maintaining a minimal internal leakage when compared to conventional hydraulic actuators.

Accordingly, hydraulic actuator 100 may include housing 102. In some embodiments, housing 102 may be configured to house and provide structural support for one or more components of hydraulic actuator 100. Accordingly, housing 102 may include an internal cavity that houses various components that may be configured to apply one or more rotational forces to another component, such as rotor 104 discussed in greater detail below, via the use of hydraulic pressure. In some embodiments, the internal cavity may be defined by an internal surface that bounds the internal components of hydraulic actuator 100 and one or more hydraulic chambers formed by those internal components. For example, the internal cavity of housing 102 may be partitioned into various hydraulic chambers each configured to receive and contain a volume of hydraulic fluid. As will be discussed in greater detail below, each hydraulic chamber may be bounded and defined by an internal surface of housing 102, a surface of a rotor such as rotor 104, a surface of a vane disk such as first vane disk 108, and a surface of a separator device such as first separator device 112.

Furthermore, according to various embodiments, the internal surface of housing 102 may be configured to have a particular curvature. For example, the internal surface of housing 102 may be configured to have a substantially circular geometry. Thus, the internal surface may have a geometry that is concentric with one or more other components of hydraulic actuator 100, such as first vane disk 108 discussed in greater detail below. When configured in this way, hydraulic actuator 100 may have a greater tolerance to hydraulic pressures endured during operation, and may further have reduced internal leakages when compared to leakages associated with housings and seals having flat mating surfaces, as previously discussed above.

In some embodiments, housing 102 may also include one or more openings through which rotor 104 may pass through. In this way, a portion of rotor 104 may be included within the internal chamber or cavity of housing 102. In some embodiments, the interface between housing 102 and rotor 104 may be sealed by seal 106 which may be configured to allow rotational motion of rotor 104 and/or housing 102 while maintaining a substantially leak-free seal between an area external to housing 102 and one or more hydraulic chambers included in the internal cavity of housing 102. In some embodiments, seal 106 may be made of any suitable type of seal. For example, seal 106 may include an O-ring seal disposed between rotor 104 and an opening of housing 102.

As discussed above, hydraulic actuator 100 may include or be coupled to rotor 104. As discussed in greater detail below with reference to FIG. 7 and FIG. 8, rotor 104 may be configured to transfer hydraulic pressure generated by one or more components of hydraulic actuator 100 to other components of a vehicle as a rotational force. Thus, rotor 104 may also be coupled to one or more other components such as a wing tip, spoiler, trailing edge flap, aileron, or any other component capable of receiving a rotational force. In operation, hydraulic pressure may be generated in one or more hydraulic chambers included in the internal cavity of housing 102. The hydraulic pressure may be transferred to rotor 104 and cause rotor 104 to rotate. As previously discussed above, rotor 104 may be mechanically coupled to another component, such as a foldable wing tip. Thus, rotation of rotor 104 may cause the foldable wing tip to move in a particular direction by, for example, extending. Furthermore, housing 102 and rotor 104 may each be made of a material such as steel, titanium, aluminum, Inconel, copper beryllium, or any of their alloys. For example, housing 102 and rotor 104 may each be made of various nickel alloys and/or copper alloys. It will be appreciated that any suitable material may be included in housing 102 and/or rotor 104. For example, housing 102 and rotor 104 may each be made of a high-performance plastic such as polyether ether ketone.

In some embodiments, rotor 104 may be configured to house or provide structural support for one or more components of hydraulic actuator 100 and may be further configured to form at least a portion of a boundary or surface of one or more hydraulic chambers included within hydraulic actuator 100. Thus, according to various embodiments, rotor 104 may include a plurality of slots that are configured to house or hold a plurality of vane disks included in hydraulic actuator 100. For example, rotor 104 may include a first slot that is configured to house first vane disk 108 discussed in greater detail below. In some embodiments the slot may be configured and precisely contoured to the geometry of a vane disk. In this way, during a manufacturing process, a vane disk may be inserted into rotor 104 and may be held in place by the mechanical coupling between the vane disk and rotor 104 provided by the mating of the vane disk with rotor 104 achieved by the precise fit between the slot and the vane disk. In this example, no additional locks or mechanical coupling devices are required to couple vane disks to rotor 104.

As discussed above, hydraulic actuator 100 may include a plurality of vane disks, which may include first vane disk 108. In some embodiments, first vane disk 108 may be a substantially circular disk that is included in the internal cavity of housing 102 and forms a portion of a boundary or surface of a hydraulic chamber implemented within the internal cavity of housing 102. In various embodiments, the curvature of the circular geometry of first vane disk 108 is configured to match or mate with the curvature of the internal surface of the internal cavity of housing 102. In this way, an edge of first vane disk 108 may contact and be mechanically coupled to the internal surface of the internal cavity. In some embodiments, a seal may be formed at an interface between the edge of first vane disk 108 and the internal cavity of housing 102. For example, the edge of first vane disk 108 may include one or more sealing devices, such as seal 110, that form a seal configured to retain hydraulic fluid within the hydraulic chamber associated with first vane disk 108. In some embodiments, seal 110 may be one or more O-ring seals, or any other suitable type of seal.

According to various embodiments, hydraulic actuator 100 further includes first separator device 112. In some embodiments, first separator device 112 may be configured to remain substantially stationary relative to housing 102. Accordingly, housing 102 and the internal chamber of housing 102 may be configured to include a slit, opening, or groove which may be configured to be contoured to an external geometry of first separator device 112. In some embodiments, first separator device 112 may be inserted into the slit or groove, and an interface between first separator device 112 and housing 102 may be sealed. In this way, first separator device 112 may be held stationary by the mechanical coupling provided by the slit or groove, and surfaces of first separator device 112 may effectively partition the internal volume of the internal chamber of housing 102. Moreover, another surface of first separator device 112, which may be a surface nearest to the center of rotor 104, may contact rotor 104 and, according to some embodiments, may be sealed, as discussed in greater detail below with reference to FIG. 3. Accordingly, first separator device 112 may be configured to provide a sealed boundary for a first hydraulic chamber included in housing 102.

Moreover, first separator device 112 may be configured to provide a motion stop for rotor 104. As discussed above, first vane disk 108 may be coupled to rotor 104, which may rotate relative to housing 102. Furthermore, first separator device 112 may be coupled to housing 102 and may remain stationary relative to housing 102. Because first vane disk 108 cannot pass through separator devices, a separator device, such as first separator device 112, provides a finite limit to the amount of rotation or travel that first vane disk 108 and rotor 104 are capable of In various embodiments, when housing 102 includes several hydraulic chambers formed by several vane disks and several separator devices, a separator device, such as first separator device 112, may be configured to provide a motion stop for an adjacent hydraulic chamber, such as that associated with second vane disk 118 discussed in greater detail below. In this way, an arrangement of vane disks and separator devices within housing 102 may be configured to achieve a precise or particular range of travel for a particular rotor, such as rotor 104. For example, vane disks and separator devices included in hydraulic actuator 100 may be configured such that rotor 104 may rotate a maximum of 120 degrees.

In various embodiments, a separator device, such as first separator device may include one or more ports configured to introduce and/or remove hydraulic fluid from a hydraulic chamber. For example, first separator device 112 may include first port 114 which may be coupled to a first hydraulic chamber associated with first vane disk 108. In this example, the first hydraulic chamber may refer to a sealed portion of the internal chamber of housing 102 that is bounded by and exists between first vane disk 108 and first separator device 112. In various embodiments, first port 114 may be coupled to an external hydraulic pump, and may be configured to transfer hydraulic fluid to or from the first hydraulic chamber via internal piping or tubing of first separator device 112. In this way, hydraulic fluid may be introduced into the first hydraulic chamber or may be removed from the first hydraulic chamber. Moreover, hydraulic fluid may be added to or removed from a complimentary hydraulic chamber which exists on the opposite side of first separator device 112. Accordingly, hydraulic fluid may be removed from the first hydraulic chamber via first port 114, and may be introduced to a complimentary hydraulic chamber via second port 116, or visa versa. In this way, hydraulic fluid may be introduced or removed via first port 114 and second port 116 to move rotor 104 in either a clockwise or counter clockwise direction.

For example, the introduction of hydraulic fluid via first port 114 may apply hydraulic pressure to first vane disk 108, which is then transferred to rotor 104 via the mechanical coupling provided by the first slot, and rotor 104 may be caused to rotate in a clockwise direction. As similarly discussed above, the circular geometry of first vane disk 108 may result in hoop stresses which are far more efficient than conventional vanes which utilize flat seals. Thus, the circular geometry of first vane disk 108 as well as the circular geometry of the internal surface of housing 102 enable the efficient transference of hydraulic pressure to one or more external components of the vehicle while experiencing minimal internal leakage.

As discussed above, hydraulic actuator 100 may include additional vane disks and separator devices, such as second vane disk 118 and second separator device 120. As similarly discussed above with reference to first vane disk 108 and first separator device 112, second vane disk 118 may be coupled to rotor 104 via a second slot. Moreover, second separator device 120 may be coupled to housing 102 via a slit or groove. In this way, the internal cavity of housing 102 may be further partitioned into additional hydraulic chambers. While hydraulic actuator 100 has been described as including two vane disks and two separator devices, any number vane disks and separator devices may be implemented. For example, hydraulic actuator 100 may include three vane disks and three separator devices.

Figure 1B:
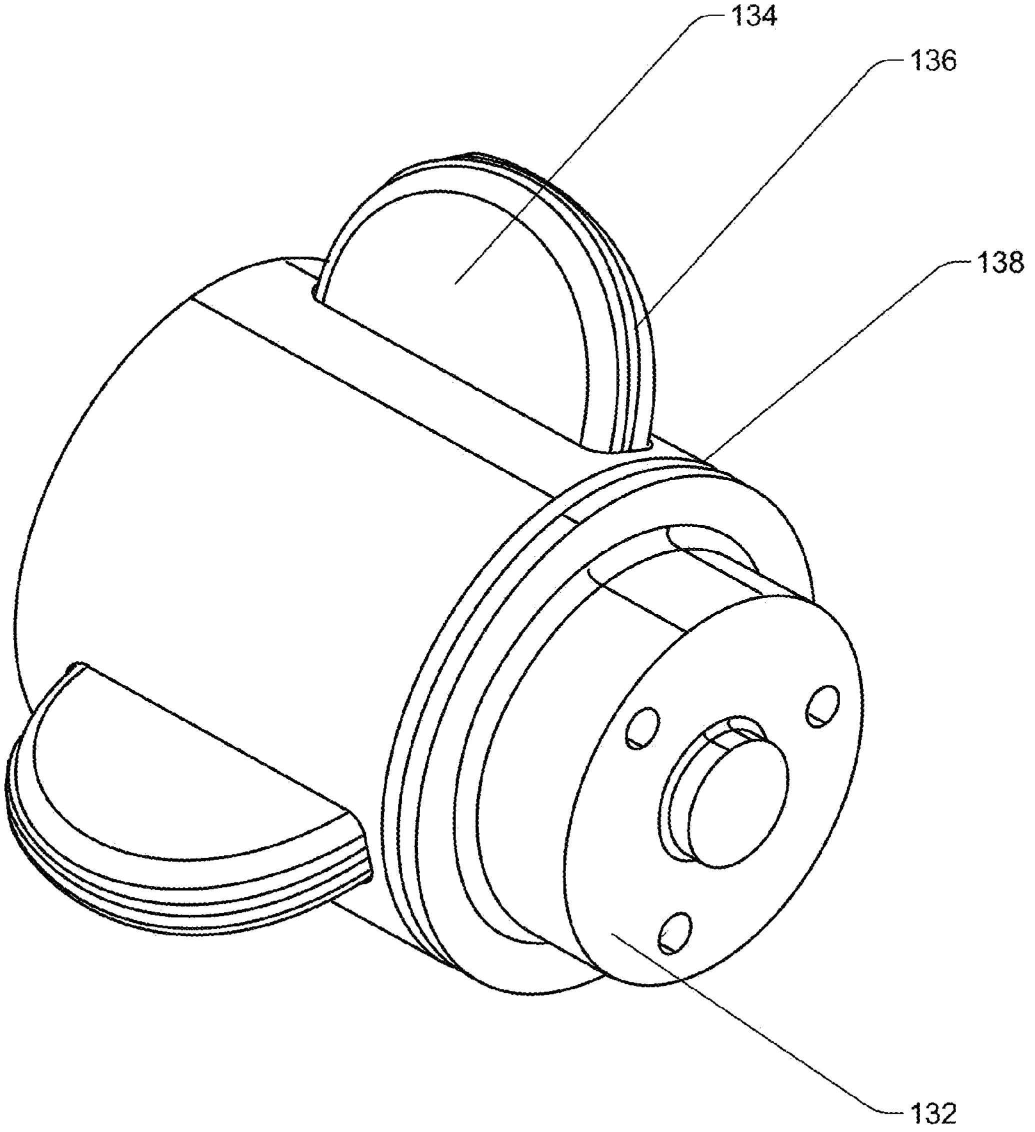
FIG. 1B illustrates a diagram of an example of a rotor coupled to multiple vane disks, implemented in accordance with some embodiments.

FIG. 1B illustrates a diagram of an example of a rotor coupled to multiple vane disks, implemented in accordance with some embodiments. As discussed above with reference to FIG. 1A, a hydraulic actuator may include a rotor and several vane disks that may be mechanically coupled to the rotor. FIG. 1B illustrates a detailed view of rotor 132 coupled to several vane disks, such as vane disk 134, with no housing for illustration purposes. Accordingly, rotor 132 may include seal 138 that may be configured to form a seal with a housing of the hydraulic actuator that includes rotor 132. Moreover, rotor 132 may include several slots configured to hold or retain vane disks, such as vane disk 134. Furthermore, each vane disk may include one or more sealing devices, such as seal 136. As previously discussed, seal 136 may be an O-ring seal configured to withstand relatively high pressures during operation which may be in excess of 3000 psi.

Figure 1C:
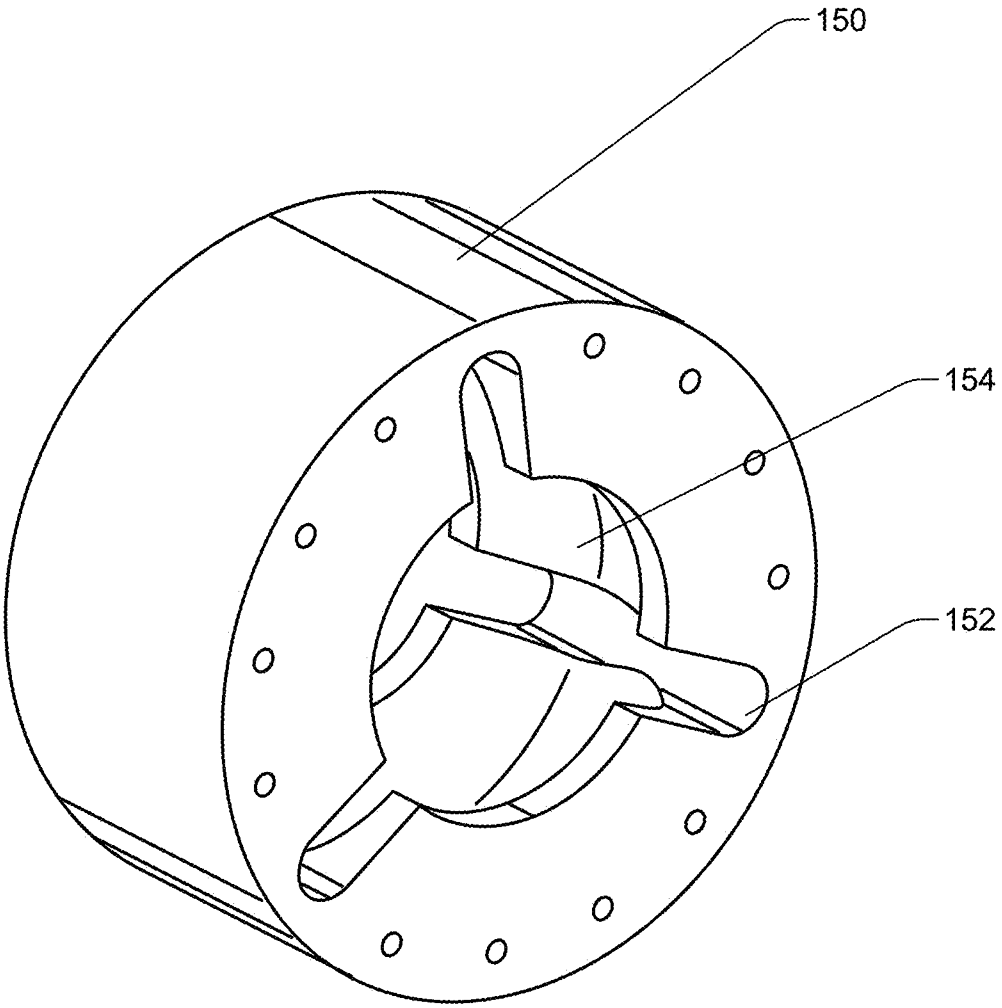
FIG. 1C illustrates a diagram of an example of a hydraulic actuator housing, implemented in accordance with some embodiments.

FIG. 1C illustrates a diagram of an example of a hydraulic actuator housing, implemented in accordance with some embodiments. As similarly discussed above, a hydraulic actuator housing, such as housing 150, may be configured to include an internal cavity, such as internal cavity 154. In various embodiments, a cross section of internal cavity 154 may be have a substantially circular curvature that is configured to precisely match the curvature of vane disks, such as vane disk 134 discussed above with reference to FIG. 1B. Thus, according to some embodiments, the rotor and vane disks discussed above with reference to FIG. 1B may be configured to fit within internal cavity 154 of housing 150. Furthermore, housing 150 may include various grooves, slots, or indentations, such as groove 152, which may be configured to hold or retain a separator device, as discussed above with reference to FIG. 1A. Accordingly, a separator device may be inserted into groove 152 to partition internal cavity 154 into one or more hydraulic chambers.

Figure 2:
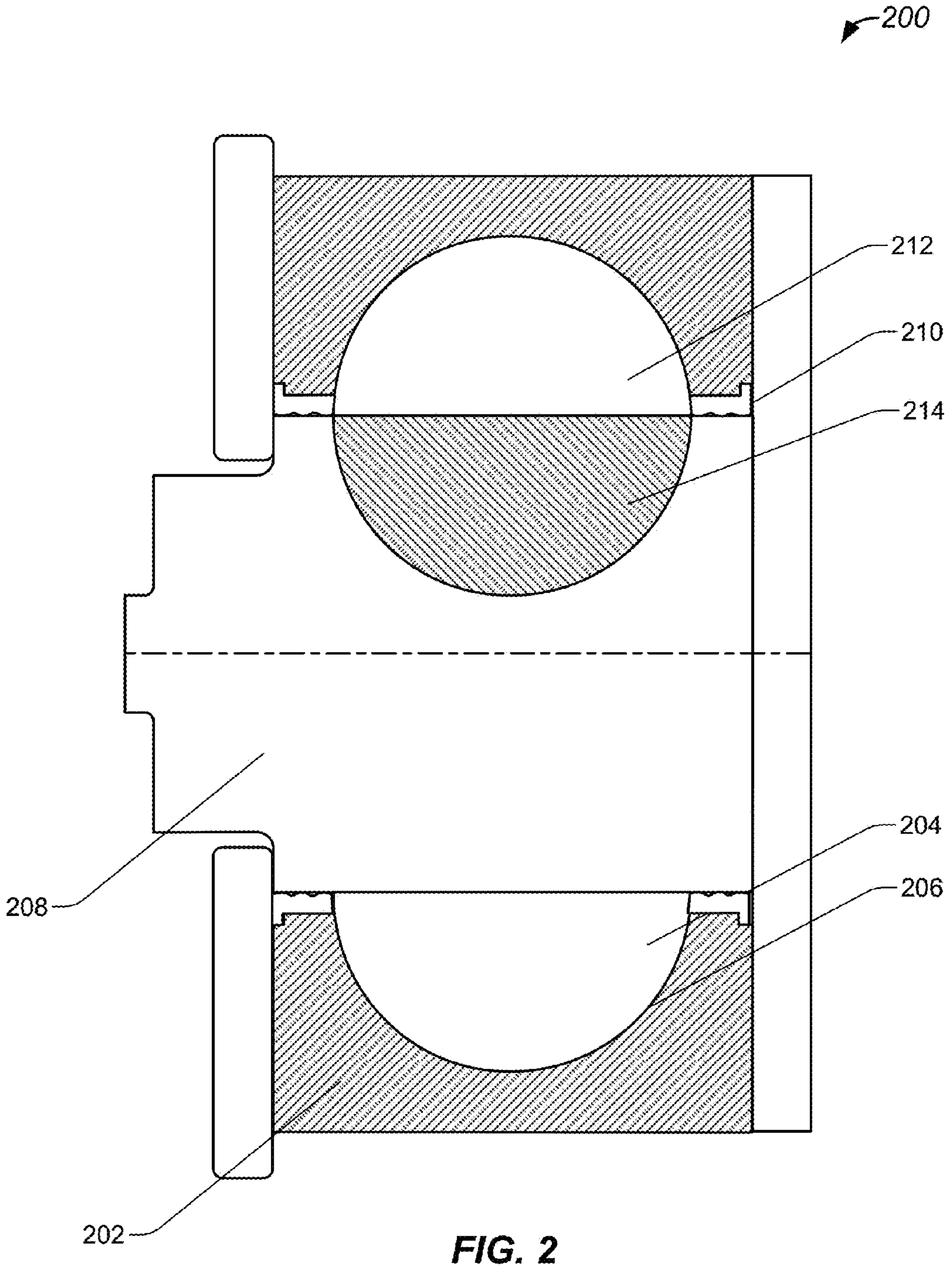
FIG. 2 illustrates a cross section of an example of a hydraulic actuator as described in FIG. 1A, implemented in accordance with some embodiments.

FIG. 2 illustrates a cross section of an example of a hydraulic actuator as described in FIG. 1A, implemented in accordance with some embodiments. As similarly discussed above with reference to FIGS. 1A-1C, hydraulic actuator 200 may include a housing, such as housing 202. Moreover, housing 202 may include internal cavity 204 which may be bounded or defined, at least in part, by internal surface 206. Furthermore, hydraulic actuator 200 may include rotor 208. In various embodiments, an interface between housing 202 and rotor 208 may be sealed to minimize leakage of a hydraulic fluid which may be introduced into internal cavity 204. Thus, housing 202 and/or rotor 208 may include a seal, such as seal 210. In some embodiments, seal 210 may be made of a durable material, such as Torlon®. According to various embodiments, the seal may be impregnated with Teflon®. When seal 210 is configured in this way, seal 210 may have increased longevity and minimized leakage when compared with conventional hydraulic actuators.

Hydraulic actuator 200 may further include vane disk 212. In some embodiments, vane disk 212 is inserted into and retained by slot 214 included in rotor 208. Thus, slot 214 may be configured to precisely match the external geometry of vane disk 212 and provides mechanical coupling sufficient to hold vane disk 212 stationary relative to rotor 208. Moreover, internal surface 206 is also configured to precisely match the external geometry of vane disk 212, thus ensuring the formation of a tight seal between vane disk 212 and housing 202. In one example, vane disk 212, slot 214, and internal surface 206 may be configured such that vane disk 212 is inserted about half way into rotor 208. In other examples, vane disk 212, slot 214, and internal surface 206 may be configured such that vane disk is inserted about 30% into rotor 208. Such a configuration may result in a relatively larger internal volume of internal cavity 204 and its associated hydraulic chambers.

Figure 3:
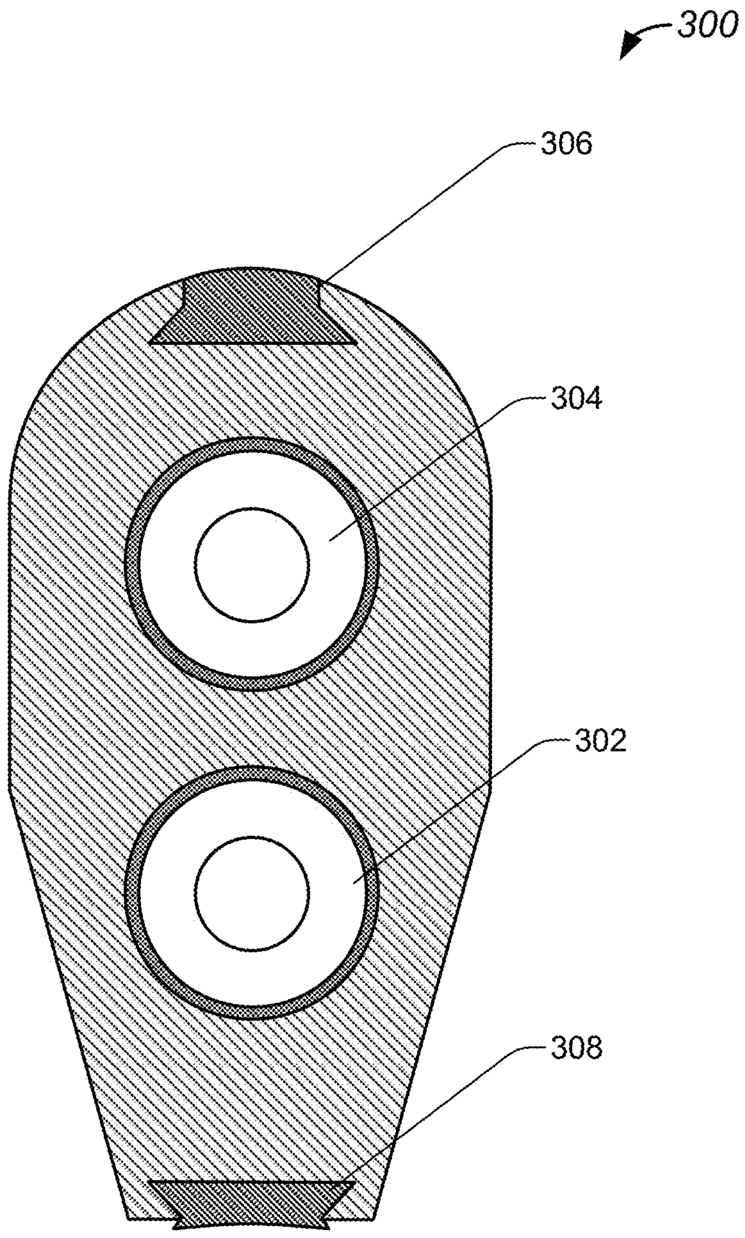
FIG. 3 illustrates a cross section of an example of a separator device as described in FIG. 1A, implemented in accordance with some embodiments.

FIG. 3 illustrates a cross section of an example of a separator device as described in FIG. 1A, implemented in accordance with some embodiments. As previously discussed, hydraulic actuators as described herein may include various separator devices which may be used, at least in part, to partition the internal volume of a housing into various different hydraulic chambers as well as provide motion stops that arrest the motion of vane disks and their corresponding rotor. Furthermore, the separator devices may include internal piping or tubing which facilitates the delivery and removal of hydraulic fluid to a hydraulic chamber. For example, separator device 300 may include first pathway 302 which may be coupled to a first port, as described above with reference to FIGS. 1A-1C. Moreover, first pathway 302 may also be coupled to a hydraulic pump which may be implemented external to the housing, but within the same vehicle that includes the housing. Furthermore, separator device may also include second pathway 304, which may be coupled to a second port, as described above with reference to FIGS. 1A-1C. Second pathway 304 may also be coupled to the hydraulic pump. In this way, first pathway 302 and second pathway 304 may provide fluidic coupling between one or more hydraulic pumps and a first and second hydraulic chamber.

Furthermore, separator device 300 may include one or more seals to maintain the integrity of adjacent hydraulic chambers and prevent internal leakage. For example, separator device 300 may include first seal 306 which may be coupled to the housing and may remain stationary during operation. Moreover, separator device 300 may also include second seal 308 which may be coupled to the rotor and may be a seal that endures movement during operation, such as a wiper seal. When implemented in this way, chambers implemented on either side of separator device 300 will be isolated from each other with minimal leakage, even during high pressure operation. As similarly discussed above, the seals may be made of Teflon® impregnated Torlon®.

Figure 4:
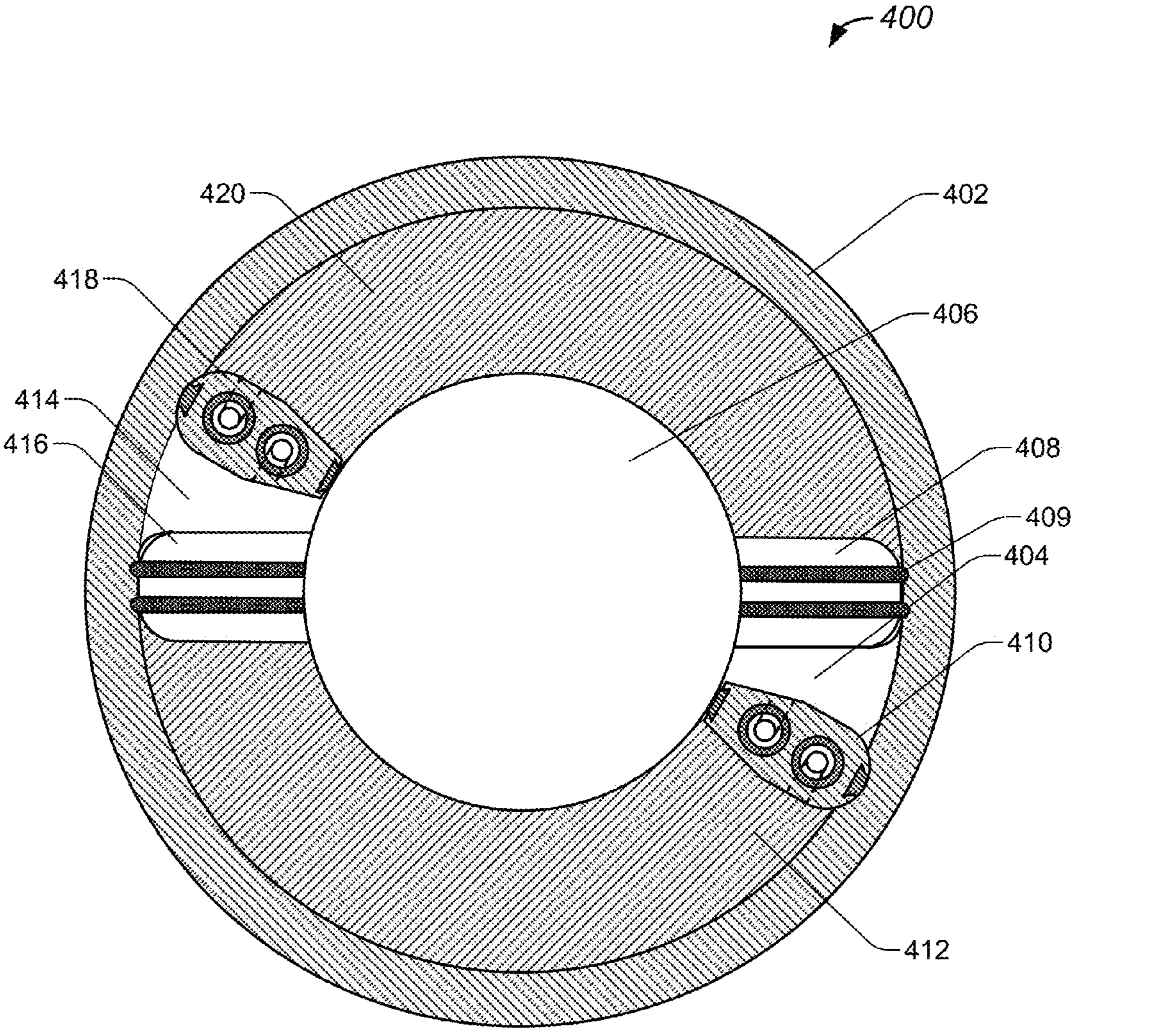
FIG. 4 illustrates an example of a hydraulic actuator that includes two vane disks, implemented in accordance with some embodiments.

FIG. 4 illustrates an example of a hydraulic actuator that includes two vane disks, implemented in accordance with some embodiments. As similarly discussed above with reference to FIGS. 1A-3, a hydraulic actuator may include one or more hydraulic chambers bounded by an internal surface of a housing, a rotor, a vane disk, and a separator device. FIG. 4 illustrates an example in which a hydraulic actuator, such as hydraulic actuator 400, includes two vane disks associated with two hydraulic chambers and their respective complimentary chambers. When implemented in this way, a rotor associated with the hydraulic actuator, such as rotor 406, may experience a larger range of travel than may be possible when more vane disks and separator devices are implemented. In this example, the rotor may travel or rotate about 180 degrees.

Thus, hydraulic actuator 400 may include a housing, such as housing 402, that may further include first hydraulic chamber 404. In this example, first hydraulic chamber 404 is bounded by an internal surface of housing 402, a surface of rotor 406, a surface of first vane disk 408, and a surface of first separator device 410. As similarly discussed above, one or more seals, such as seal 409, may be implemented to maintain the integrity of first hydraulic chamber 404 during operation. Furthermore, hydraulic actuator 400 may further include first complimentary chamber 412, which may be configured to experience a flow of hydraulic fluid opposite to the flow of hydraulic fluid associated with first hydraulic chamber 404, and may be configured to generate a rotational force in a direction opposite to that generated by first hydraulic chamber 404.

Moreover, hydraulic actuator 400 may further include second hydraulic chamber 414. In this example, second hydraulic chamber 414 is bounded by the internal surface of housing 402, a surface of rotor 406, a surface of second vane disk 416, and a surface of second separator device 418. Furthermore, hydraulic actuator 400 may further include second complimentary chamber 420, which may be configured to experience a flow of hydraulic fluid opposite to the flow of hydraulic fluid associated with second hydraulic chamber 414, and may be configured to generate a rotational force in a direction opposite to that generated by second hydraulic chamber 414.

Figure 5:
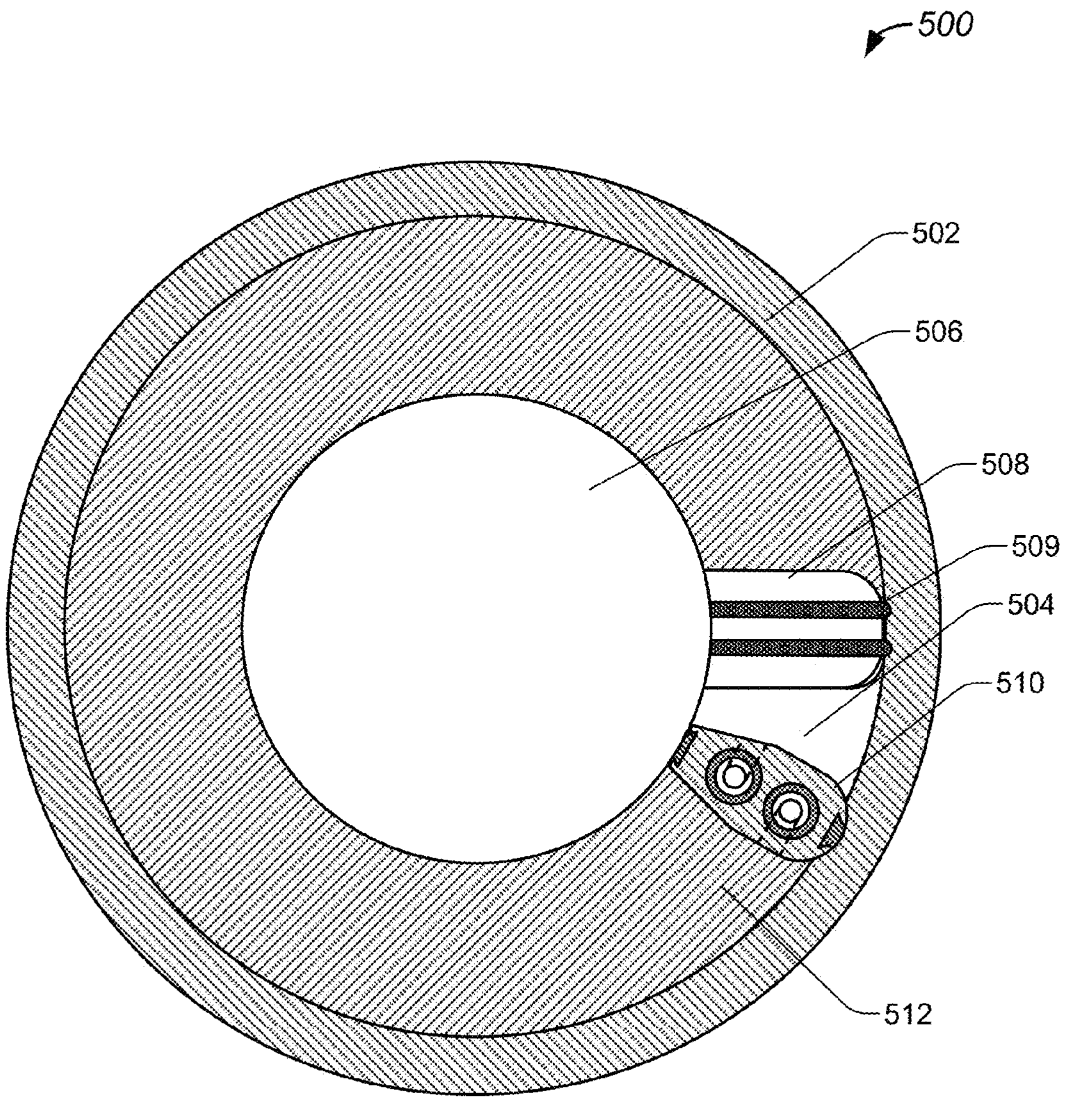
FIG. 5 illustrates an example of a hydraulic actuator that includes one vane disk, implemented in accordance with some embodiments.

FIG. 5 illustrates an example of a hydraulic actuator that includes one vane disk, implemented in accordance with some embodiments. As similarly discussed above with reference to FIGS. 1A-4, a hydraulic actuator may include a hydraulic chamber bounded by an internal surface of a housing, a rotor, a vane disk, and a separator device. FIG. 5 illustrates an example in which a hydraulic actuator, such as hydraulic actuator 500, includes one vane disk associated with one hydraulic chamber and its respective complimentary chamber. When implemented in this way, a rotor associated with the hydraulic actuator, such as rotor 506, may experience a larger range of travel than may be possible when more vane disks and separator devices are implemented. In this example, the rotor may travel or rotate about 320 degrees.

Thus, hydraulic actuator 500 may include a housing, such as housing 502, that may further include first hydraulic chamber 504. In this example, first hydraulic chamber 504 is bounded by an internal surface of housing 502, a surface of rotor 506, a surface of first vane disk 508, and a surface of first separator device 510. As similarly discussed above, one or more seals, such as seal 509, may be implemented to maintain the integrity of first hydraulic chamber 504 during operation. Furthermore, hydraulic actuator 400 may further include first complimentary chamber 512, which may be configured to experience a flow of hydraulic fluid opposite to the flow of hydraulic fluid associated with first hydraulic chamber 504, and may be configured to generate a rotational force in a direction opposite to that generated by first hydraulic chamber 504.

Figure 6:
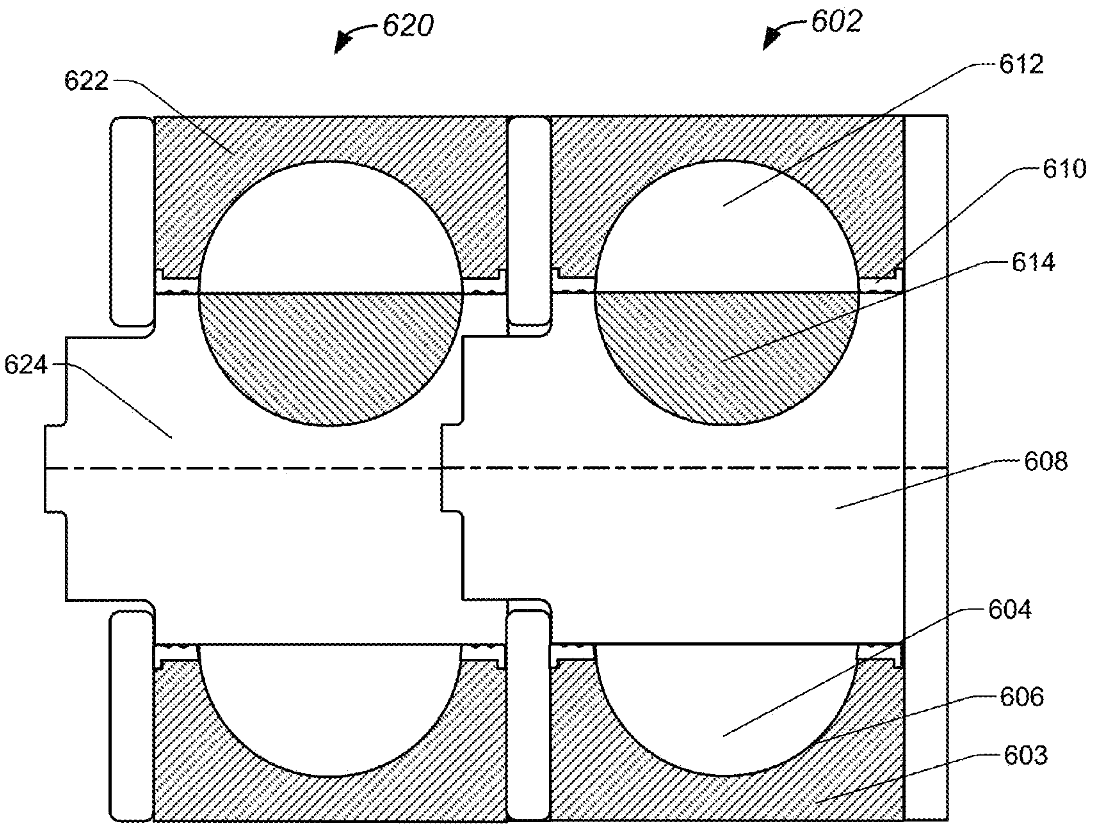
FIG. 6 illustrates a cross section of an example of a combination of two hydraulic actuators, implemented in accordance with some embodiments.

FIG. 6 illustrates a cross section of an example of a combination of two hydraulic actuators, implemented in accordance with some embodiments. In various embodiments, multiple hydraulic actuators may be coupled in series to increase a total amount of rotational force that may be generated and applied to a rotor. Accordingly a first hydraulic actuator, such as first hydraulic actuator 602, may be coupled to a second hydraulic actuator, such as second hydraulic actuator 620. When configured in this way, first hydraulic actuator 602 and second hydraulic actuator 620 may each generate rotational forces that are collectively applied to one or more portions of a rotor. Thus, the total rotational force transferred by the rotor is determined based on the output of both the first hydraulic actuator 602 and second hydraulic actuator 620.

As similarly discussed above with reference to FIGS. 1A-5, each hydraulic actuator, such as first hydraulic actuator 602, may include a housing, such as first housing 603. For example, first housing 603 may include first internal cavity 604 which may be bounded or defined, at least in part, by first internal surface 606. Furthermore, first hydraulic actuator 600 may include first rotor portion 608. In various embodiments, an interface between first housing 603 and first rotor portion 608 may be sealed to minimize leakage of a hydraulic fluid which may be introduced into first internal cavity 604. Thus, first housing 603 and/or first rotor portion 608 may include a seal, such as first seal 610. In some embodiments, first seal 610 may be made of a durable material, such as Teflon impregnated Torlon®. Moreover, a hydraulic actuator may further include vane disks, such as first vane disk 612. In some embodiments, first vane disk 612 is inserted into and retained by first slot 614 included in first rotor portion 608. Thus, first slot 614 may be configured to precisely match the external geometry of first vane disk 612 and provides mechanical coupling sufficient to hold first vane disk 612 stationary relative to first rotor portion 608. Moreover, first internal surface 606 may also be configured to precisely match the external geometry of first vane disk 612, thus ensuring the formation of a tight seal between first vane disk 612 and first housing 603.

As discussed above, a second hydraulic actuator, such as second hydraulic actuator 620 may be coupled to first hydraulic actuator 602. In some embodiments, second hydraulic actuator 620 may be configured to include the same or similar components as first hydraulic actuator 602. Moreover, one or more components of second hydraulic actuator 620 may be mechanically coupled to first hydraulic actuator 602. For example, first housing 603 may be coupled to second housing 622. In some embodiments, such coupling may be achieved by an adhesive, welding technique, or mounting bracket. Moreover, first rotor portion 608 may be similarly coupled to second rotor portion 624. In some embodiments, first rotor portion 608 and second rotor portion 624 may be different portions of the same rotor. In this way, rotational forces generated by hydraulic chambers included in first hydraulic actuator 602 and second hydraulic actuator 620 may be transferred to different portions of the same rotor, and may collectively drive a rotation of the rotor.

Figure 7:
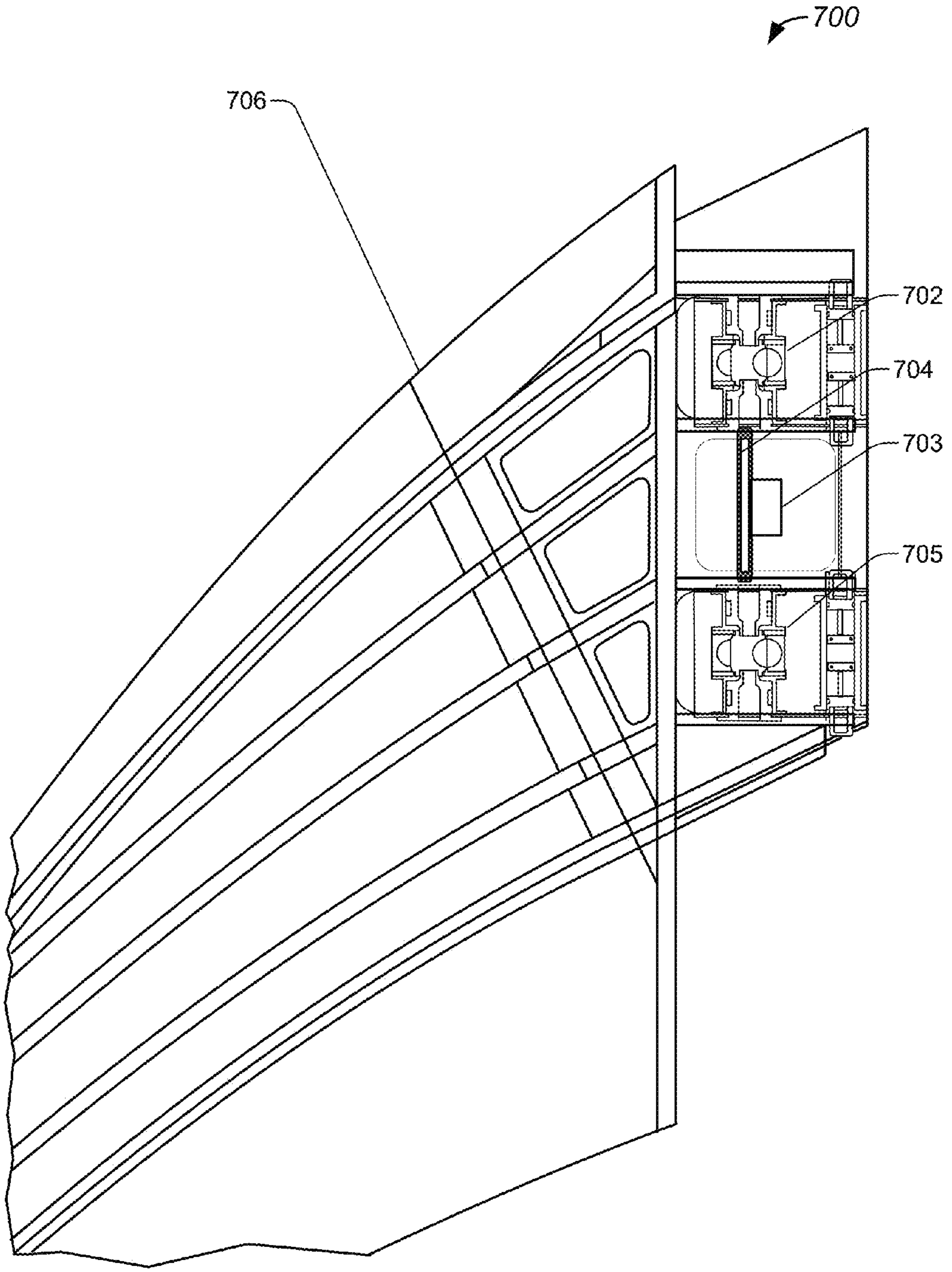
FIG. 7 illustrates an example of hydraulic actuators configured to move a control surface of an airplane, implemented in accordance with some embodiments.

FIG. 7 illustrates an example of hydraulic actuators configured to move a control surface of an airplane, implemented in accordance with some embodiments. As similarly discussed above with reference to FIGS. 1A-6, one or more hydraulic actuators may be included in a vehicle, such as an airplane, to apply rotational forces to airplane components. FIG. 7 illustrates one example of an implementation of two hydraulic actuators coupled to a first control surface of an airplane. According to various embodiments, a control surface of an airplane may be a surface or component that is configured to change or affect flight characteristics of an airplane in response to a change in position or orientation of the surface itself. For example, a control surface may be moved to change a lift or upwards force generated by an airplane wing in response to a medium, such as air, passing by the wing. In this example, the control surface of the airplane may be a movable or foldable portion of a wingtip of an airplane. Accordingly, wingtip 700 includes first hydraulic actuator 702 and second hydraulic actuator 704 which are both coupled to a single rotor, such as rotor 705.

Furthermore, both first hydraulic actuator 702 and second hydraulic actuator 704 may be coupled to one or more components of a hydraulic system, such as hydraulic pump 703. According to some embodiments, rotor 705 is coupled to folding portion 706 which represents a foldable section of a wingtip positioned at a distal end of the wing. According to some embodiments, first hydraulic actuator 702 and second hydraulic actuator 704 may be configured to generate a first rotational force and a second rotational force, respectively. The first rotational force and the second rotational force may be applied to rotor 705, transferred to folding portion 706, thus causing a portion of wingtip 700 to rotate and move.

Figure 8:
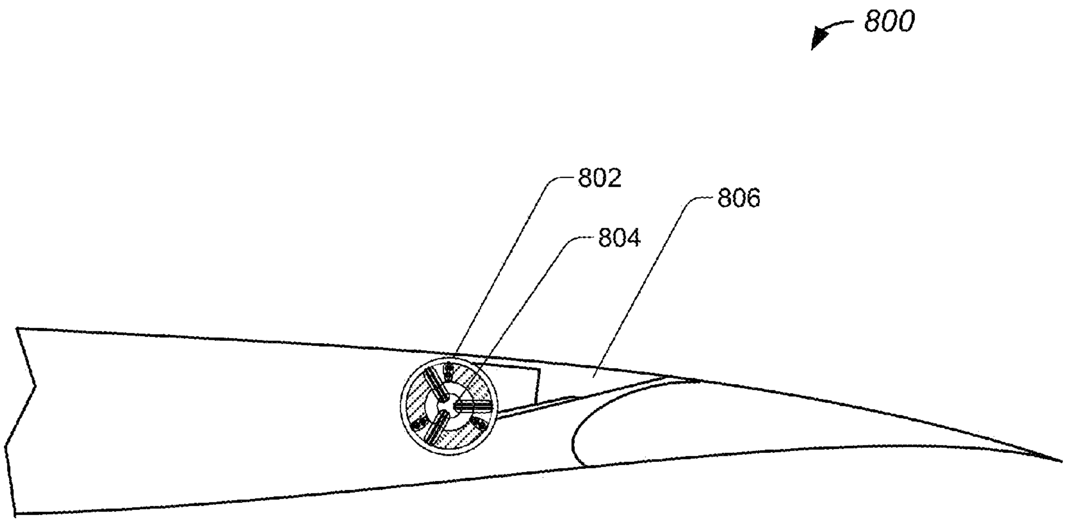
FIG. 8 illustrates an example of a hydraulic actuator configured to move another control surface of an airplane, implemented in accordance with some embodiments.

FIG. 8 illustrates an example of a hydraulic actuator configured to move another control surface of an airplane, implemented in accordance with some embodiments. As similarly discussed above with reference to FIGS. 1A-7, hydraulic actuators may be included in a vehicle, such as an airplane, to apply one or more rotational forces to airplane components. FIG. 8 illustrates an example in which a hydraulic actuator, such as hydraulic actuator 802, is included in a trailing portion or a trailing edge compartment of an airplane wing. Accordingly, wing 800 may include hydraulic actuator 802 which may be coupled to a rotor, such as rotor 804. In some embodiments, rotor 804 is coupled to a second control surface of the airplane. For example, the second control surface may be spoiler 806 which is a movable portion of wing 800 that may be adjusted or configured to alter or modify one or more aerodynamic properties of wing 800. According to some embodiments, hydraulic actuator 802 is configured to generate a rotational force that may be applied to rotor 804, and transferred to spoiler 806. In this way, hydraulic actuator 802 may cause spoiler 806 to move, and may adjust the aerodynamic properties of wing 800.

While FIG. 7 and FIG. 8 have been discussed with reference to control surfaces such as a foldable or movable portion of a wingtip and a spoiler of a wing, hydraulic actuators as disclosed herein may be coupled to any suitable airplane component or control surface. For example, hydraulic actuators as disclosed herein may be included in an empennage section of an airplane and may be configured to transfer a rotational force to one or more components of the empennage, such as a vertical or horizontal stabilizing control surfaces and/or a rudder.

Figure 9:
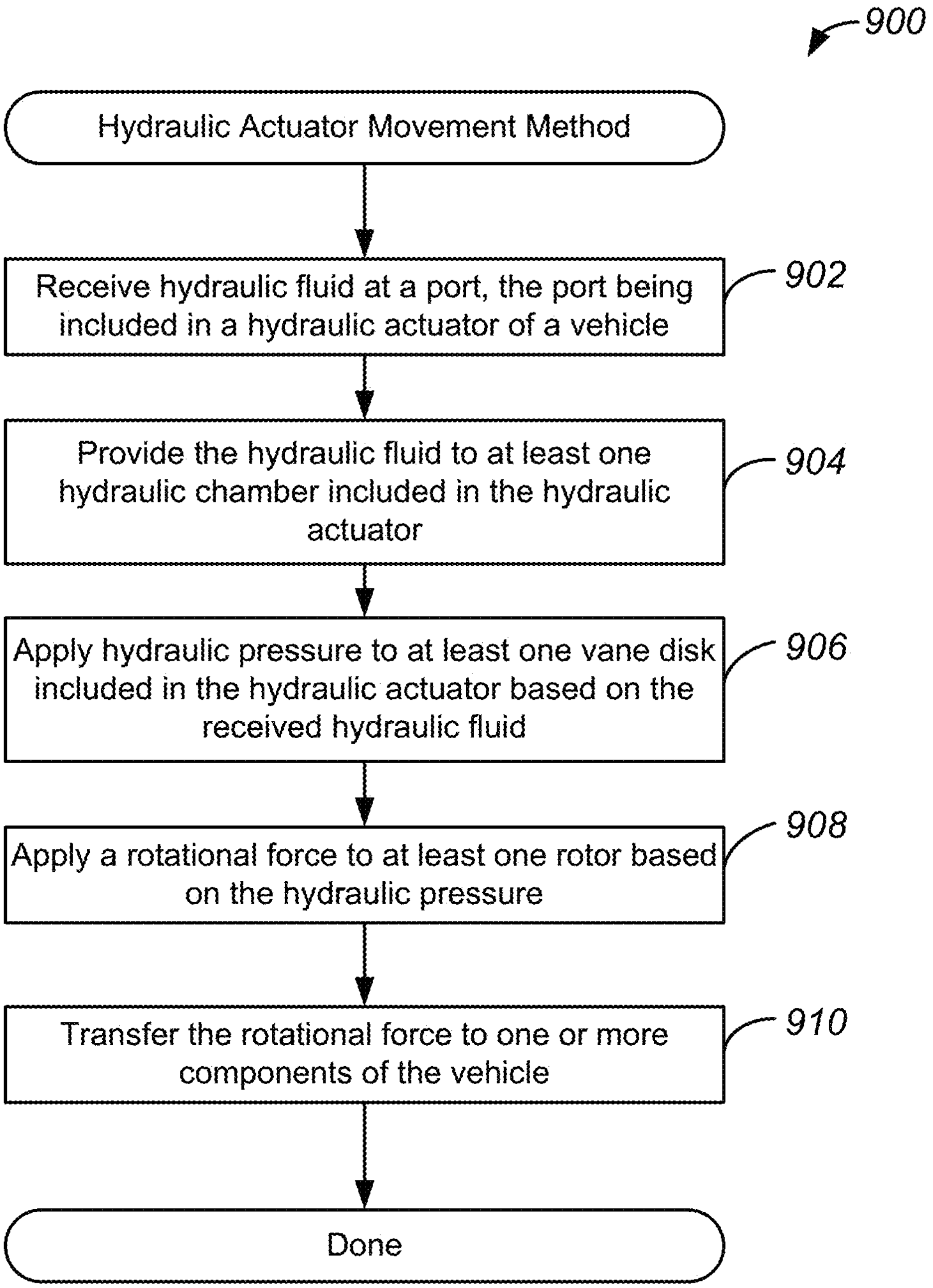
FIG. 9 illustrates a method of using a hydraulic actuator, implemented in accordance with some embodiments.

FIG. 9 illustrates a method of using a hydraulic actuator, implemented in accordance with some embodiments. As previously discussed, various components of a hydraulic actuator may cause the rotation of one or more components of a vehicle in response to the application of one or more hydraulic fluids. Accordingly, method 900 may commence with operation 902, during which hydraulic fluid may be received at a first port. As discussed above with reference to FIGS. 1A-8, a hydraulic actuator may include various ports configured to handle the flow of hydraulic fluid into and out of various chambers included in the hydraulic actuator. In some embodiments, the hydraulic fluid may be received from a reservoir and may be pressurized by a pump. The hydraulic fluid may be received at a housing of the hydraulic actuator and provided to internal pathways of one or more separator devices. Accordingly, the hydraulic fluid may be provided to one separator device, or may be provided to multiple separator devices included in the same hydraulic actuator. For example, the hydraulic fluid may be provided to a first port of a first separator device that may be associated with a first hydraulic chamber of the hydraulic actuator.

Method 900 may proceed to operation 904, during which the hydraulic fluid may be provided to the hydraulic chamber included in the hydraulic actuator. Accordingly, the hydraulic fluid may enter the hydraulic chamber and proceed to fill the hydraulic chamber. As previously discussed, the hydraulic chamber may be bounded by the separator device a vane disk, an internal surface of the housing, and a surface of the rotor. One or more seals may retain the hydraulic fluid within the hydraulic chamber and prevent any internal leakage that may otherwise occur.

Method 900 may proceed to operation 906, during which a hydraulic pressure may be applied to at least one vane disk included in the hydraulic actuator. Accordingly, as the hydraulic chamber fills and hydraulic fluid continues to be pumped into the hydraulic chamber, a hydraulic pressure may develop within the hydraulic chamber and be applied to all surfaces that form the hydraulic chamber, including a surface of the vane disk. As previously discussed, the hydraulic pressure may be relatively high during operation. In some embodiments, the pressure may be about 500 psi to 4000 psi. In one example, and may be about 3000 psi.

Method 900 may proceed to operation 908, during which a rotational force may be applied to a rotor coupled to the vane disk. As previously discussed, the vane disk may be mechanically coupled to the rotor via a precise contouring of slots formed within the rotor to an external surface of the vane disk. Once inserted into the slot, the vane disk is mechanically coupled to the rotor, and remains substantially stationary relative to the rotor. As previously discussed, no additional fastening devices are required, thus resulting in a robust coupling of the vane disk to the rotor, and significantly less weight than conventional hydraulic actuators. Once the hydraulic force is applied to a surface of the vane disk, the vane disk may transfer that force to the rotor via the previously described mechanical coupling. In this way, the transferred force may cause the rotor to rotate.

Method 900 may proceed to operation 910, during which the rotational force may be transferred to one or more components of the vehicle that includes the hydraulic actuator. As similarly discussed above, the rotor may be coupled to other components of a vehicle, such as an aircraft. For example, the rotor may be coupled to a folding wingtip, a spoiler, or a tail flap. In some embodiments, the rotor may transfer the rotational force to the one or more other components, thus causing them to move. For example, if coupled to a folding wingtip, the rotor may transfer the rotational force to the folding wingtip and cause the folding wingtip to move and change its orientation.

Figure 10:
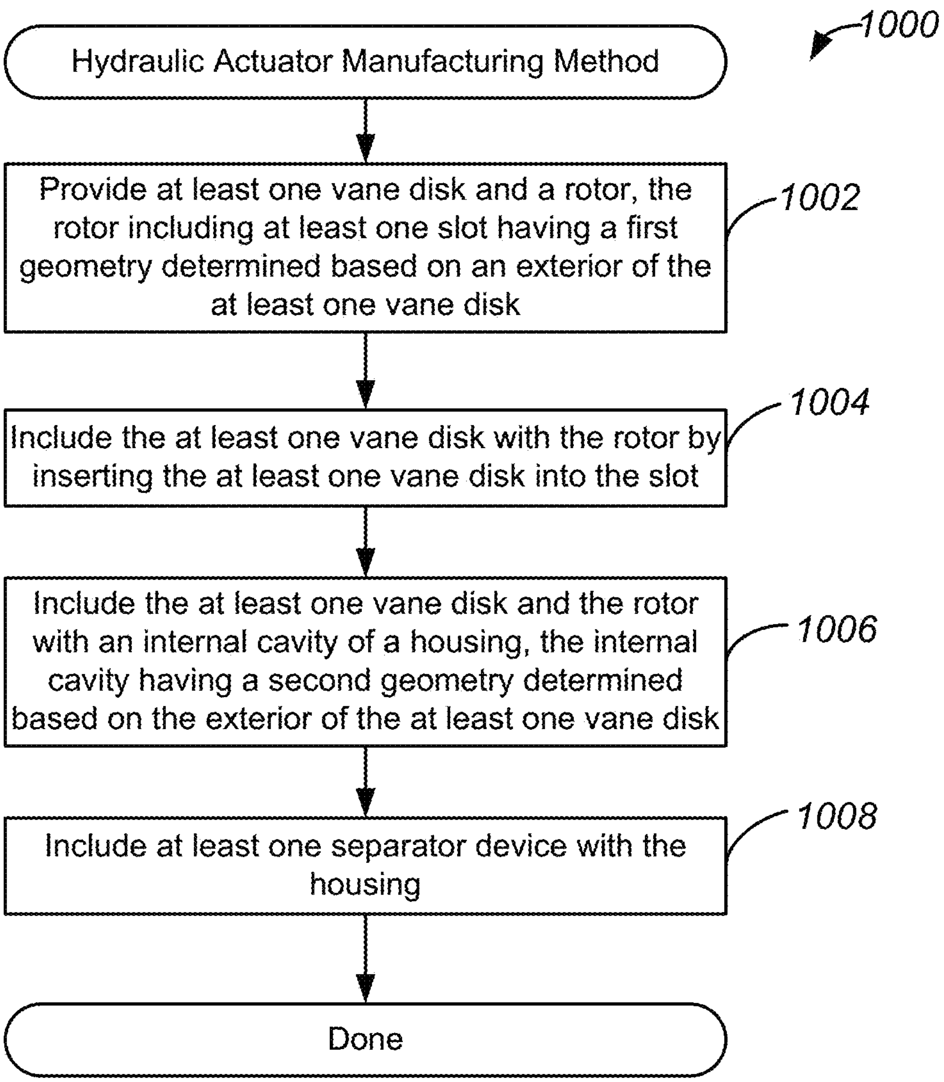
FIG. 10 illustrates a method of manufacturing a hydraulic actuator, implemented in accordance with some embodiments.

FIG. 10 illustrates a method of manufacturing a hydraulic actuator, implemented in accordance with some embodiments. Method 1000 may commence with operation 1002, during which at least one vane disk and a rotor may be provided. In some embodiments the rotor and the vane disk may be received from a third party manufacturer during operation 1002. In various embodiments, the rotor and the vane disk may be manufactured via a forging process, a machining process, a fast fabrication process, or any other suitable manufacturing process that may be implemented. Furthermore, operation 1002 may include receiving or fabricating multiple vane disks and a rotor having multiple slots for the multiple vane disks. For example, three vane disks may be fabricated, and a rotor having three slots may also be fabricated.

In some embodiments, the rotor may include at least one slot that is configured to have a geometry that is determined based on an exterior of the at least one vane disk. For example, a vane disk may have a circular geometry and a particular thickness. The slot may be configured to have dimensions slightly larger than the external dimensions of the vane disk. Thus, the slot may also have a circular geometry and a particular thickness, but the radius of the circular geometry and thickness may be slightly larger than those of the vane disk itself In some embodiments, the dimensions of the slot may be between about 0.25% and 5% larger than those of the vane disk.

Method 1000 may proceed to operation 1004, during which the at least one vane disk may be included with the rotor. In some embodiments, operation 1004 may include inserting the at least one vane disk into its associated slot within the rotor. As previously discussed, no additional fastening devices need be used. In some embodiments, the precise contouring of the respective parts is sufficient to mechanically couple them to each other. In various embodiments, an adhesive may be applied for additional coupling. Moreover, operation 1004 may include inserting multiple vane disks into multiple slots of a rotor. Returning to a previous example, a rotor may include three slots, and three vane disks may be inserted into the three slots during operation 1004.

Method 1000 may proceed to operation 1006, during which the at least one vane disk and the rotor may be included in an internal cavity of a housing. In some embodiments, the housing may have an opening configured to receive the rotor, and may also have at least one groove or slit configured to receive the portion of the vane disk that protrudes from the rotor and is not included within its associated slot. Accordingly, the rotor and at least one vane disk may be inserted via the grooves and openings on the exterior side of the housing, and may be aligned with the internal cavity of the housing. As previously discussed, the internal cavity may be configured based on the external geometry of the vane disk. Thus, the internal cavity may have a curvature that closely matches the curvature of the at least one vane disk. Accordingly, once inserted and aligned, the rotor may be rotated slightly to entrain the at least one vane disk within the internal cavity, and to misalign the groove and the at least one vane disk, thus enabling the subsequent insertion of at least one separator device into the grove, as described in greater detail below.

Method 1000 may proceed to operation 1008, during which at least one separator device may be included with the housing. The at least one separator device may have an external geometry that matches the groove or slit in the side of the housing. Thus, the separator device may be inserted into the groove or slit and may be mechanically coupled to the housing via the precise contouring of the respective parts. As previously discussed, the separator device may include various ports and internal pathways which may be coupled to a hydraulic system to enable hydraulic operation of the hydraulic actuator.

Figure 11:
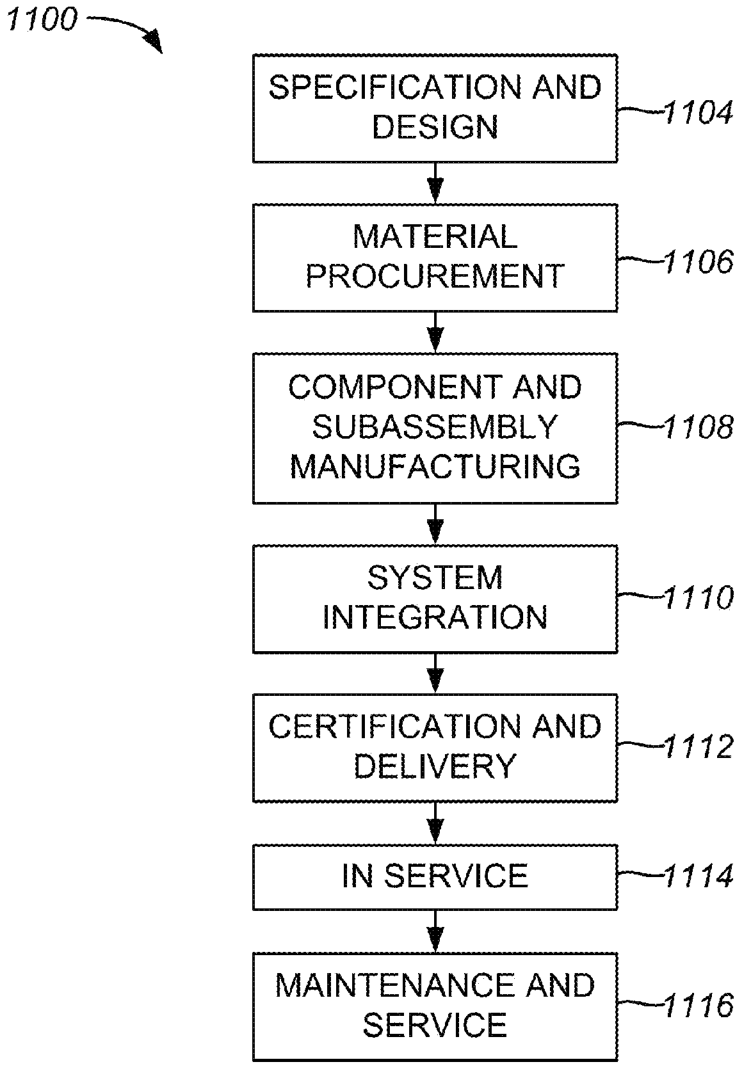
FIG. 11 illustrates a flow chart of an example of an aircraft production and service methodology, in accordance with some embodiments.
Figure 12:
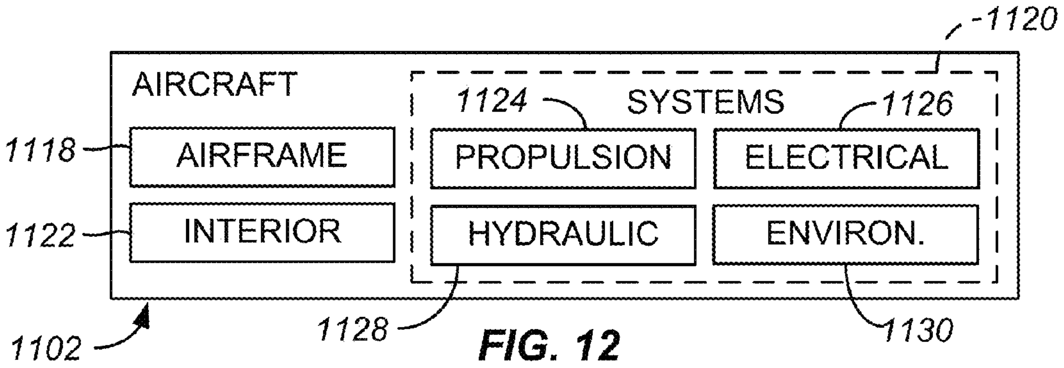
FIG. 12 illustrates a block diagram of an example of an aircraft, implemented in accordance with some embodiments.

Embodiments of the disclosure may be described in the context of an aircraft manufacturing and service method 1100 as shown in FIG. 11 and an aircraft 1102 as shown in FIG. 12. During pre-production, illustrative method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by illustrative method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production process 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A device comprising:

a housing having an internal surface defining an internal cavity, and the internal cavity having a substantially circular cross sectional curvature;

a rotor coupled to the housing, the rotor including a first slot having a substantially circular curvature, and the rotor being configured to rotate within the housing in response to an application of a rotational force;

a first vane disk partially disposed within the first slot of the rotor, the first vane disk having a substantially circular external geometry, the first vane disk being mechanically coupled to the rotor via the first slot, and the first vane disk being configured to form a first seal with the internal surface of the housing; and a first separator device included in the internal cavity of the housing, the first separator device being configured to form a second seal with the internal surface of the housing and a third seal with an external surface of the rotor, the first separator device being configured to transfer hydraulic fluid between the internal cavity and an external reservoir.

2. The device of claim 1, wherein the first vane disk is disposed about half way into the first slot.

3. The device of claim 1, wherein the internal cavity comprises:

a first hydraulic chamber defined by a portion of the internal surface, a portion of an exterior surface of the rotor, a first surface of the first vane disk, and a first surface of the first separator device.

4. The device of claim 3, wherein the first separator device includes:

an internal pathway; and a port configured to transfer the hydraulic fluid between the first hydraulic chamber and the external reservoir.

5. The device of claim 1, wherein the rotor further comprises:

a second slot; and a third slot;

wherein the device further comprises:

a second vane disk partially disposed within the second slot, the second vane disk having a substantially circular external geometry, the second vane disk being configured to form a third seal with the internal surface of the housing;

a second separator device forming a second hydraulic chamber between the second vane disk and the second separator device, the second separator device being configured to form a fourth seal with the internal surface of the housing;

a third vane disk partially disposed within the third slot, the third vane disk having a substantially circular external geometry, the third vane disk being configured to form a fifth seal with the internal surface of the housing; and a third separator device forming a third hydraulic chamber between the third vane disk and the third separator device, the third separator device being configured to form a sixth seal with the internal surface of the housing.

6. The device of claim 5, wherein the first vane disk, the second vane disk, and the third vane disk each comprise:

a sealing device that includes an O-ring seal.

7. The device of claim 6, wherein the first separator device, the second separator device, and the third separator device each comprise:

a stationary seal coupled to the internal surface of the housing; and a wiper seal coupled to the external surface of the rotor.

8. The device of claim 1, wherein a rotary travel of the rotor is between about 60 degrees and 180 degrees.

9. The device of claim 1, wherein the housing and the rotor are made of steel, titanium, aluminum, Inconel, copper beryllium, or any of their alloys.

10. The device of claim 1, wherein the rotor is coupled to a control surface of an airplane, wherein the control surface is configured to affect a flight characteristic of the airplane, and wherein the rotor is configured to transfer the rotational force to the control surface in response to receiving the rotational force from the first vane disk.

11. The device of claim 10, wherein the rotor is included in a trailing edge cavity of an airplane wing included in the airplane, and wherein the control surface is an airplane spoiler.

12. A system comprising:

a first housing having a first internal surface defining a first internal cavity, and the first internal cavity having a substantially circular cross sectional curvature;

a first rotor coupled to the first housing, the first rotor including a first plurality of slots each having a substantially circular curvature, and the first rotor being configured to rotate within the first housing in response to an application of a first rotational force;

a first plurality of vane disks partially disposed within the first plurality of slots of the first rotor, the first plurality of vane disks each having a substantially circular external geometry, the first plurality of vane disks each being mechanically coupled to the first rotor via the first plurality of slots, and the first plurality of vane disks being configured to form a first plurality of seals with the first internal surface of the first housing;

a first plurality of separator devices included in the first internal cavity of the first housing, the first plurality of separator devices being configured to form a second plurality of seals with the first internal surface of the first housing and a third plurality of seals with an external surface of the first rotor, the first plurality of separator devices being configured to transfer hydraulic fluid between at least the first internal cavity and an external reservoir; and a hydraulic pump configured to pump hydraulic fluid between the first internal cavity and the external reservoir via a first plurality of ports included in the first plurality of separator devices.

13. The system of claim 12, wherein the first internal cavity comprises:

a first plurality of hydraulic chambers, wherein each hydraulic chamber of the first plurality of hydraulic chambers is defined by a portion of the first internal surface, a portion of an exterior surface of the first rotor, a first surface of each vane disk of the first plurality of vane disks, and a first surface of each separator device of the first plurality of separator devices.

14. The system of claim 13, wherein each seal of the second plurality of seals comprises:

a stationary seal between a separator device of the first plurality of separator devices and the first internal surface of the first housing, and wherein each seal of the third plurality of seals comprises:

a wiper seal between a separator device of the first plurality of separator devices and the external surface of the rotor.

15. The system of claim 12 further comprising:

a second housing having a second internal surface defining a second internal cavity;

a second rotor coupled to the second housing, the second rotor including:

a second plurality of slots, and the second rotor being configured to rotate within the second housing in response to an application of a second rotational force;

a second plurality of vane disks partially disposed within the second plurality of slots, the second plurality of vane disks each having a substantially circular external geometry, the second plurality of vane disks each being mechanically coupled to the second rotor via the second plurality of slots, and the second plurality of vane disks being configured to form a fourth plurality of seals with the second internal surface of the second housing; and a second plurality of separator devices included in the second internal cavity of the second housing, the second plurality of separator devices being configured to form a fifth plurality of seals with the second internal surface of the second housing and a sixth plurality of seals with an external surface of the second rotor.

16. The system of claim 15, wherein the first rotor extends from the first housing, wherein the second rotor extends from the second housing, and wherein the first rotor is mechanically coupled to the second rotor.

17. A method of constructing a hydraulic actuator, the method comprising:

providing at least one vane disk and a rotor, the rotor including at least one slot having a first geometry determined based on an external geometry of the at least one vane disk, the external geometry of the at least one vane disk being substantially circular;

including the at least one vane disk in the rotor via the at least one slot such that the at least one vane disk is at least partially disposed within the rotor;

including the at least one vane disk and the rotor in an internal cavity of a housing, the internal cavity having a second geometry determined based on the external geometry of the at least one vane disk, and the at least one vane disk forming a first seal with the internal surface of the housing; and including at least one separator device in the housing, the at least one separator device forming a second seal with an internal surface of the housing and a third seal with an external surface of the rotor.

18. The method of claim 17, wherein the providing of the at least one vane disk and the rotor comprises:

machining the at least one vane disk and the rotor from a metal.

19. The method of claim 18, wherein the metal is selected from the group consisting of: steel, titanium, aluminum, Inconel, copper beryllium, and any of their alloys.

* * * * *